(12) United States Patent
Liedenbaum et al.

(10) Patent No.: US 7,024,061 B2
(45) Date of Patent: Apr. 4, 2006

(54) OPTICAL SCANNING DEVICE (75) Inventors: Coen Theodorus Hubertus Fransiscus Liedenbaum, Eindhoven (NL); Hendrik Van Houten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 10/498,142

(22) PCT Filed: Nov. 22, 2002

(86) PCT No.: PCT/IB02/04953

§ 371 (c)(1),
(2), (4) Date: Jun. 8, 2004

(87) PCT Pub. No.: WO03/050800

PCT Pub. Date: Jun. 19, 2003

(65) Prior Publication Data
US 2005/0084950 A1   Apr. 21, 2005

(30) Foreign Application Priority Data
Dec. 11, 2001   (EP) .................................. 01204801

(51) Int. Cl.
*G02B 6/00* (2006.01)
*G11B 7/00* (2006.01)

(52) U.S. Cl. .................. 385/12; 385/25; 385/88; 385/92; 385/129; 385/130; 369/44.18; 369/44.22; 369/44.26

(58) Field of Classification Search .................. 385/12, 385/25, 88, 89, 92, 129, 130, 11, 147, 14; 369/44.18, 44.22, 44.26
See application file for complete search history.

(56) References Cited

U.S. PATENT DOCUMENTS

| 4,074,085 | A | * | 2/1978 | Russell | 369/44.37 |
| 4,321,700 | A | * | 3/1982 | Russell | 369/44.18 |
| 5,235,583 | A | * | 8/1993 | Jongenelis et al. | 369/44.26 |
| 5,289,442 | A | * | 2/1994 | Van Rosmalen | 369/44.22 |
| 5,708,638 | A | * | 1/1998 | Braat et al. | 369/44.29 |

* cited by examiner

Primary Examiner—Brian M. Healy (57) ABSTRACT

An optical scanning device (21) is for scanning with a radiation beam a substantially circular track of an information layer (22). The device includes: (i) a radiation source (26) for providing the radiation beam (34), (ii) a lens system (27) for transforming the radiation beam to a scanning spot (38) in the information layer, the lens system including a first objective lens assembly (39) having an optical axis (CC'), (iii) a head rotation unit (59) for the first objective lens assembly which is rotatable about an axis of rotation (BB'), and (iv) first driving means (60) for rotating the head rotation unit about the axis of rotation. The center of curvature of the track substantially coincides with the axis of rotation. According to the invention, the objective lens assembly is movable substantially in a radial direction with respect to and perpendicular to the axis of rotation.

6 Claims, 9 Drawing Sheets

OPTICAL SCANNING DEVICE

The invention relates to an optical scanning device for scanning a track of an information layer of an optical record carrier by means of a radiation beam, the track being substantially circular with a center of curvature, the device including: (a) a radiation source for providing said radiation beam, (b) a lens system for transforming said radiation beam to a scanning spot on said information layer, the lens system including a first objective lens assembly having an optical axis, (c) a head rotation unit for supporting said first objective lens assembly, the unit being rotatable about an axis of rotation and said center of curvature of said track substantially coinciding with said axis of rotation, and (d) a first driving means for rotating said head rotation unit about said axis of rotation.

The invention also relates to an optical scanning system for scanning an optical record carrier, the scanning system including an optical record carrier having an information layer provided with a substantially circular track and an optical scanning device which includes: (a) a radiation source for providing said radiation beam, (b) a lens system for transforming said radiation beam to a scanning spot on said information layer, the lens system including a first objective lens assembly having an optical axis, (c) a head rotation unit for supporting said first objective lens assembly, the unit being rotatable about an axis of rotation and said center of curvature of said track substantially coinciding with said axis of rotation, and (d) a first driving means for rotating said head rotation unit about said axis of rotation.

"Scanning an information layer" refers to scanning with a radiation beam for reading information from the information layer ("reading mode"), writing information in the information layer ("writing mode"), and/or erasing information from the information layer ("erase mode").

Figure 1:
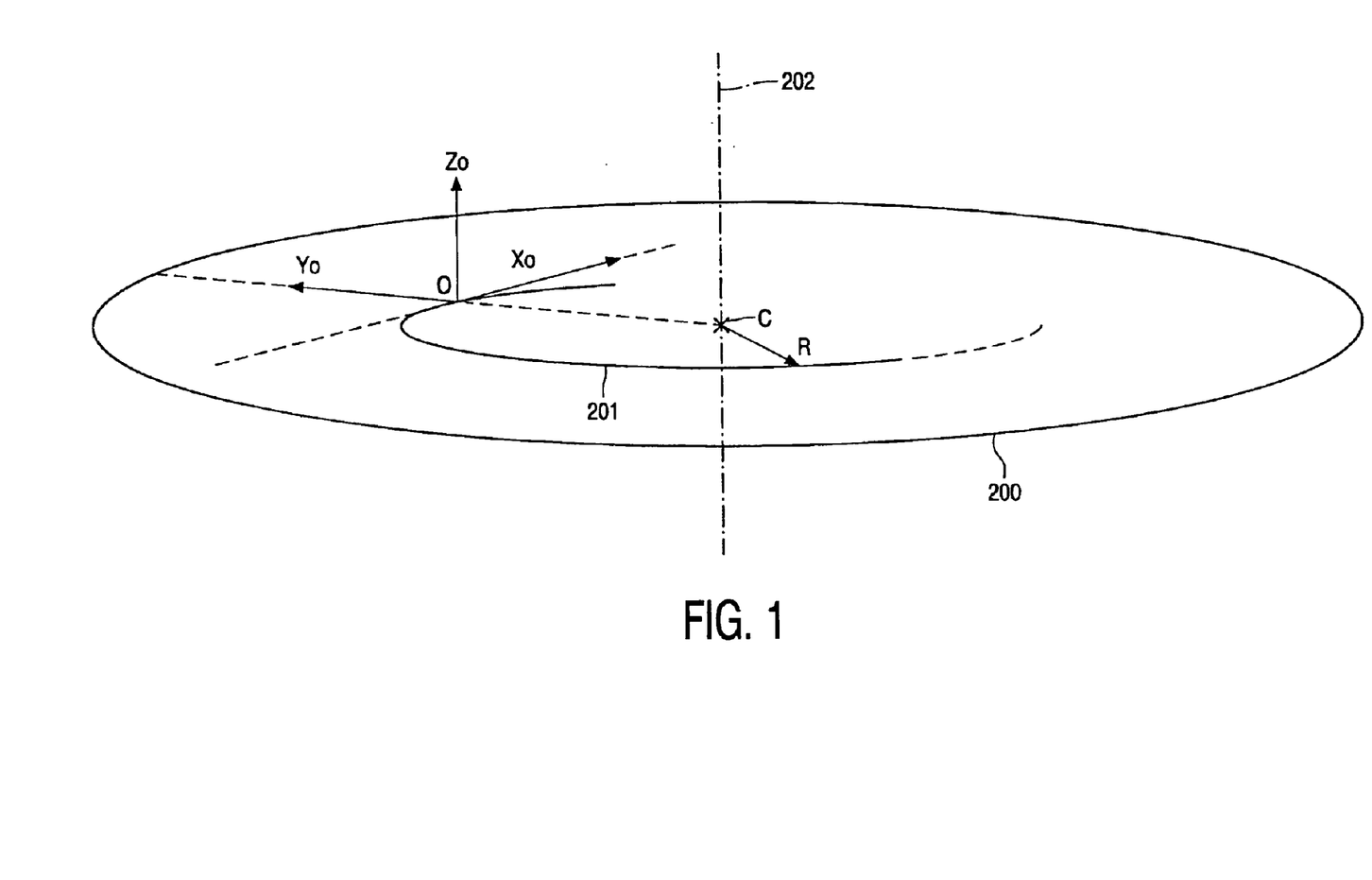
FIG. 1 shows an optical record carrier with a circular track, together with the reference axes.

An "information layer" is a layer of an optical record carrier that contains tracks. A "track" is a path to be followed by a focused radiation beam on which path optically-readable marks are arranged that represent information. The marks may be, e.g., in the form of pits or areas with a reflection coefficient or a direction of magnetization different from the surroundings. FIG. 1 shows an optical record carrier 200 including a track 201 (a center line of which is shown in FIG. 1). In the following, a track is "substantially circular" if it has the shape of a circle or a spiral or a part thereof, with a center of curvature, C, and a radius of curvature, R. The following axes are defined with respect to a point 0 of the center line of the track 201. "$Y_o$" is a reference axis parallel to the "radial direction" of the track 201 (that is, the direction from the center C to the point O), "$X_o$" is a reference axis parallel to the "tangential direction" (that is, the direction that is tangential to the track in the point O and perpendicular to the radial direction), and "$Z_o$" is a reference axis such that ($X_o$, $Y_o$, $Z_o$) is a direct orthogonal base. It is common in the art that the optical record carrier 200 has the shape of a disc with an axis of symmetry 202 which is normal to that disc and which passes through with the center C of the track 201.

Figure 2A:
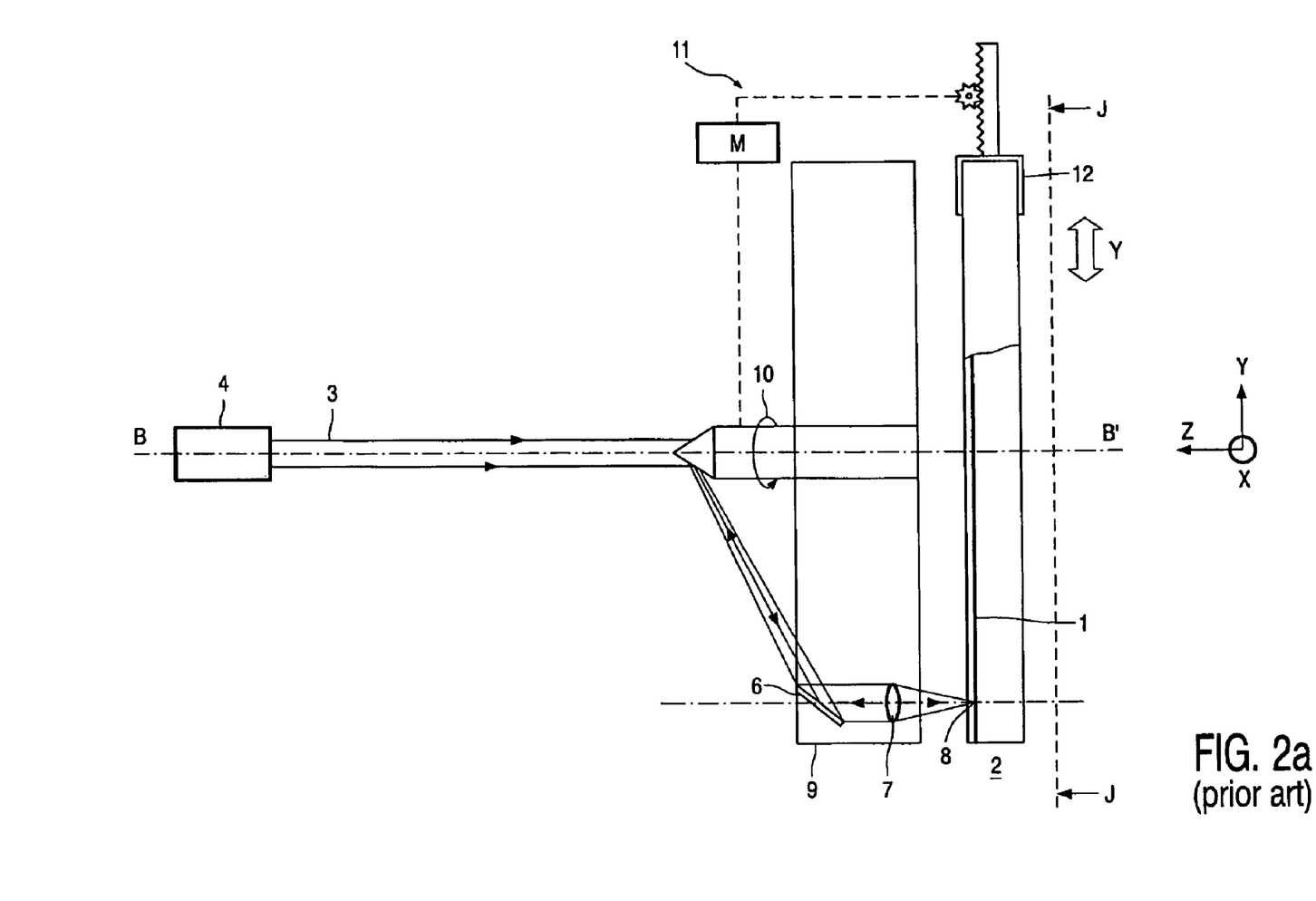
FIG. 2*a* shows a known optical scanning device.

An optical scanning device as described in the opening paragraph is known from U.S. Pat. No. 4,219,704. With reference to FIG. 2a of the present description, the known optical scanning device is for scanning a track of an information layer 1 of an optical record carrier 2 by means of a radiation beam 3. It includes: a radiation source 4 for providing the radiation beam 3, a lens system 6, 7 for transforming the radiation beam 3 to a scanning spot 8 in the information layer 1, a head rotation unit 9 for the lens system 6, 7 which is rotatable about an axis of rotation BB', and a driving means (not shown in FIG. 1) for rotating the head rotation unit 9 about the axis of rotation BB'. With reference to FIG. 2a and in the following, "Z" is a reference axis parallel to the axis of rotation BB', "Y" is a reference axis parallel to the radial direction with respect to and perpendicular to the axis of rotation BB' and "X" is a reference axis perpendicular to both the Y- and Z-axes. (X, Y, Z) is a direct orthogonal triad. Furthermore, during scanning of an optical record carrier of the type described with reference to FIG. 1, the center of curvature of the track to be scanned substantially coincides with the axis of rotation BB' of the scanning device. Thus, the $Y_o$-axis (the radial direction of the track) substantially coincides with the Y-axis (the radial direction with respect to the axis of rotation BB') and the $X_o$-axis (the tangential direction of the track) substantially coincides with the X-axis.

With reference to FIG. 2a, the head rotation unit 9 includes a rotating wheel which carries the lens system 6, 7. The lens system 6, 7 has an optical axis parallel to the Z-axis.

Figure 2B:
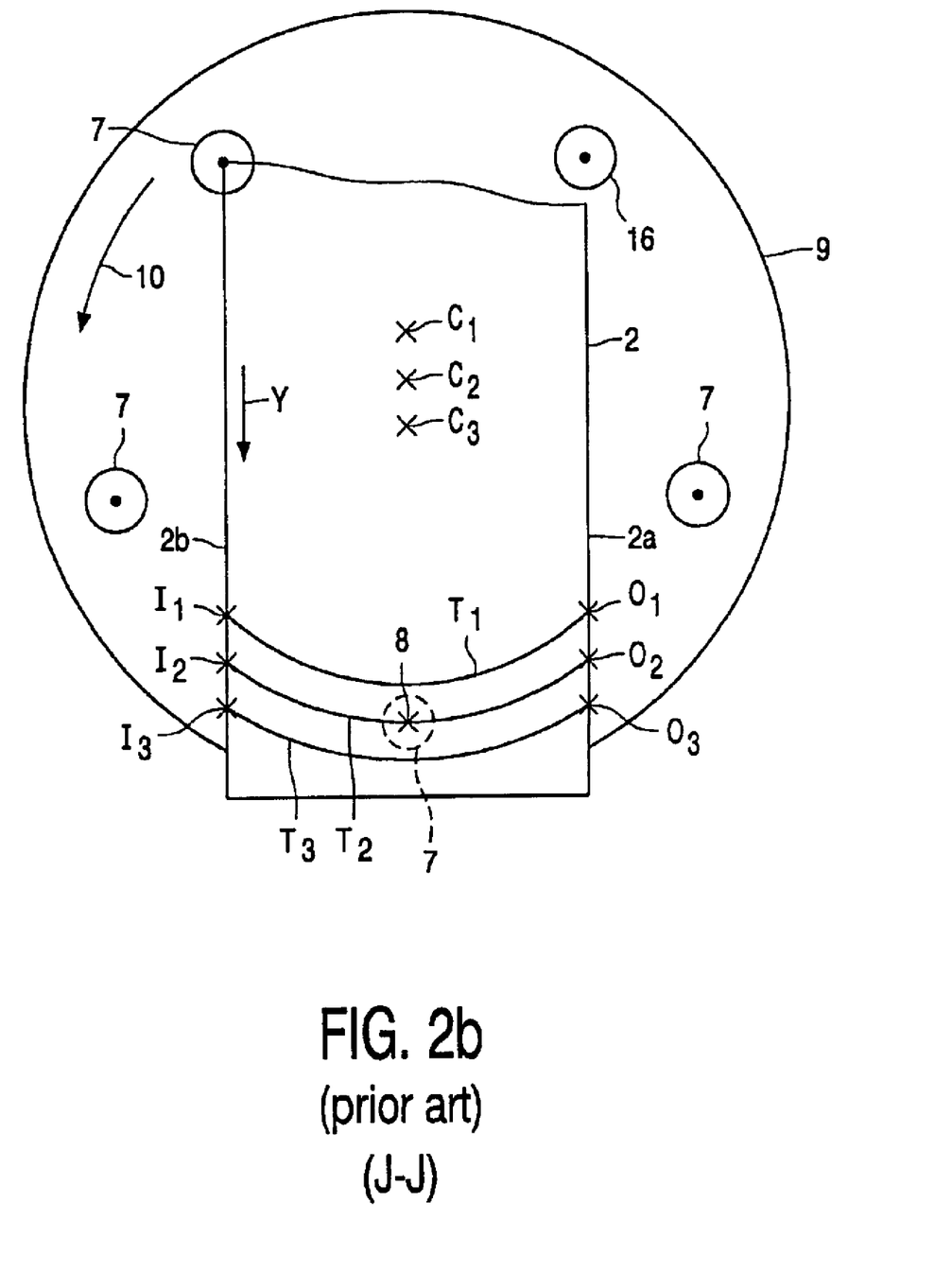
FIG. 2*b* is an elevation view taken along the line J—J of FIG. 2*a*.

FIG. 2b is an elevation view taken along the line J—J of FIG. 2a. As shown in FIG. 2b, the record carrier 2 has an input border 2a and an output border 2b. A plurality of tracks $T_1$, $T_2$, $T_3$ . . . is arranged in the record carrier 2 between the two borders 2a and 2b, in the form of portions of circles having the same radius and different centers $C_1$, $C_2$, $C_3$ . . . , respectively. Thus, each track, e.g. the track $T_2$, has two outers, e.g. $I_2$ and $O_2$.

During scanning of the track $T_2$, the objective lens 7 (shown in dotted line in FIG. 2b) rotates about the axis of rotation BB' in the sense of rotation 10. The scanning spot 8 follows the track $T_2$, so that information data is then scanned from the point $I_2$ to the point $O_2$ of the track. Furthermore, in order to scan from one track, e.g. the track $T_2$, to another track, e.g. the track $T_3$, the record carrier 2 is moved slowly along the direction Y by means of a worm gear apparatus 11 (shown in FIG. 2a). The worm gear apparatus 11 moves a carriage 12 which supports the optical record carrier 2. Thus, the record carrier 2 is moved along the Y-axis (as indicated in FIG. 2) and the track $T_3$ of the information layer 1 can then be scanned.

A disadvantage of the known device is that it requires the use of record carriers having a format of the type described with reference with FIG. 2b. As a result, the known device is not compatible with the most commonly used record carriers that have significantly different formats, in particular with tracks generally formed along a spiral.

Another disadvantage of the known device is that, during scanning of a track, e.g. the track $T_2$, the scanning spot 8 rotates from the point $I_2$ to the point $O_2$ and then flies over the output border 2a of the record carrier 2, without coinciding with any information data to be scanned from the point $O_2$ to the point $I_2$. In other words, the known device provides a discontinuous scanning of the record carrier 2. In order to avoid periods of time where no information data is scanned, the rotating wheel 9 is provided with a multihead having a plurality of objective lenses 7 as shown in FIG. 2b. This makes the known device expensive.

Another disadvantage of the known device is that, each time the objective lens 7 flies over the input border 2b of the record carrier 2, it needs be repositioned for focus and radial tracking purposes, so that the scanning spot 8 is in focus and on track with the track to be scanned.

Another disadvantage of the known device is that, each time the objective lens 7 flies over the input border 2b of the record carrier 2, the data scanned in the track and close to the input border 2*b* cannot be retrieved during the period of time necessary for repositioning of the objective lens 7 for focus and radial tracking purposes.

An object of the invention is to provide an optical scanning device that includes an objective lens assembly which is rotatable about an axis of rotation during scanning, and that allows a continuous scanning of an optical record carrier having an information layer provided with a substantially circular track.

This object is achieved by an optical scanning device as described in the opening paragraph wherein, according to the invention, the first objective lens assembly is movable substantially in a radial direction (Y) with respect to and perpendicular to the axis of rotation. An advantage of a first objective lens assembly movable substantially in the radial direction (Y) is to allow adjustment of the distance between the objective lens and the axis of rotation along the radial direction. Thus, the optical scanning device can scan tracks arranged, e.g. in the form of a spiral, on the entire surface of the information layer. Thus, another track of the information layer can be scanned by changing the position of the first objective lens assembly along the radial direction (Y) with respect to the axis of rotation of the unit. Such positioning between the first objective lens and the record carrier does not require the position of the optical record carrier to be changed with respect to the axis of rotation, as in the optical scanning device known from U.S. Pat. No. 4,219,704.

A preferred embodiment of the head rotation unit includes a first positioning means for controlling the position of the first objective lens assembly substantially in the radial direction (Y) with respect to the axis of rotation of the head rotation unit. This advantageously results in controlling which track to be scanned and also in enabling a continuous scanning of the track on the information layer. Thus, another advantage of a movable objective lens assembly is to avoid the use of a multihead as described for the known optical scanning device, since the optical scanning device according to the invention allows of a continuous scanning of the record carrier.

A preferred embodiment of the first positioning means further includes a first counterbalancing means or counterweight for keeping the center of gravity of the head rotation unit substantially on the axis of rotation of the unit. An advantage of providing the first positioning means with such a first counterbalancing means is to make the optical scanning device mechanically stable during the rotation of the unit.

A preferred embodiment of the first counterbalancing means includes a second objective lens assembly. An advantage of providing the first counterbalancing means with a second objective lens assembly is to allow the scanning of an additional information layer or of the same or different track on the information layer by the second objective lens assembly (simultaneous scanning). For instance, the first objective lens assembly may be used for scanning a first optical record carrier of a first type (e.g. the so-called CD-format or the so-called DVD-format) and the second objective lens assembly may be used for scanning a second optical record carrier of a second, different type (e.g. the so-called DVR-format).

Another preferred embodiment of the first counterbalancing means further includes a second counterbalancing means for reducing the dependence of the centrifugal forces of the head rotation unit on its rotation frequency, so that the moment of inertia of the first objective lens assembly is substantially constant during rotation. An advantage of providing the head rotation unit with such a second counterbalancing means is to make the optical scanning device mechanically stable during the rotation of the unit, especially at high values of velocity.

A preferred embodiment of the optical scanning device further includes a second driving means for rotating the optical record carrier about the axis of rotation of the unit and in a sense of rotation which is opposite to the rotation of the unit. An advantage of providing the optical scanning device with a such second driving means is to increase the information scanning rate by combining the rotation velocities of the first objective system and the optical record carrier.

Another preferred embodiment of the optical scanning device further includes a second positioning means for positioning the optical record carrier in a plane substantially perpendicular to the axis of rotation of the unit. An advantage of providing the optical scanning device with such a second positioning means is to adjust the distance between the center of the track to be scanned and the axis of rotation of the unit. This allows the adjustment of the optical record carrier along the radial direction (Y) and the tangential direction (X) of the track in order to avoid misalignment between the center of the track and the axis of rotation of the unit. As a result, electrical power consumed for keeping the scanning spot on track is minimized.

Another object of the invention is to provide an optical scanning system including an optical record carrier having an information layer provided with a substantially circular track, and an optical scanning device that includes an objective lens assembly which is rotatable about an axis of rotation during scanning, and that allows a continuous scanning of the track.

This object is achieved by an optical scanning system as described in the opening paragraph wherein, according to the invention, said first objective lens assembly is movable substantially in a radial direction (Y) with respect to and perpendicular to said axis of rotation.

The objects, advantages and features of the invention will be apparent from the following, more detailed description of the invention, as illustrated in the accompanying drawings, in which.

Figure 3:
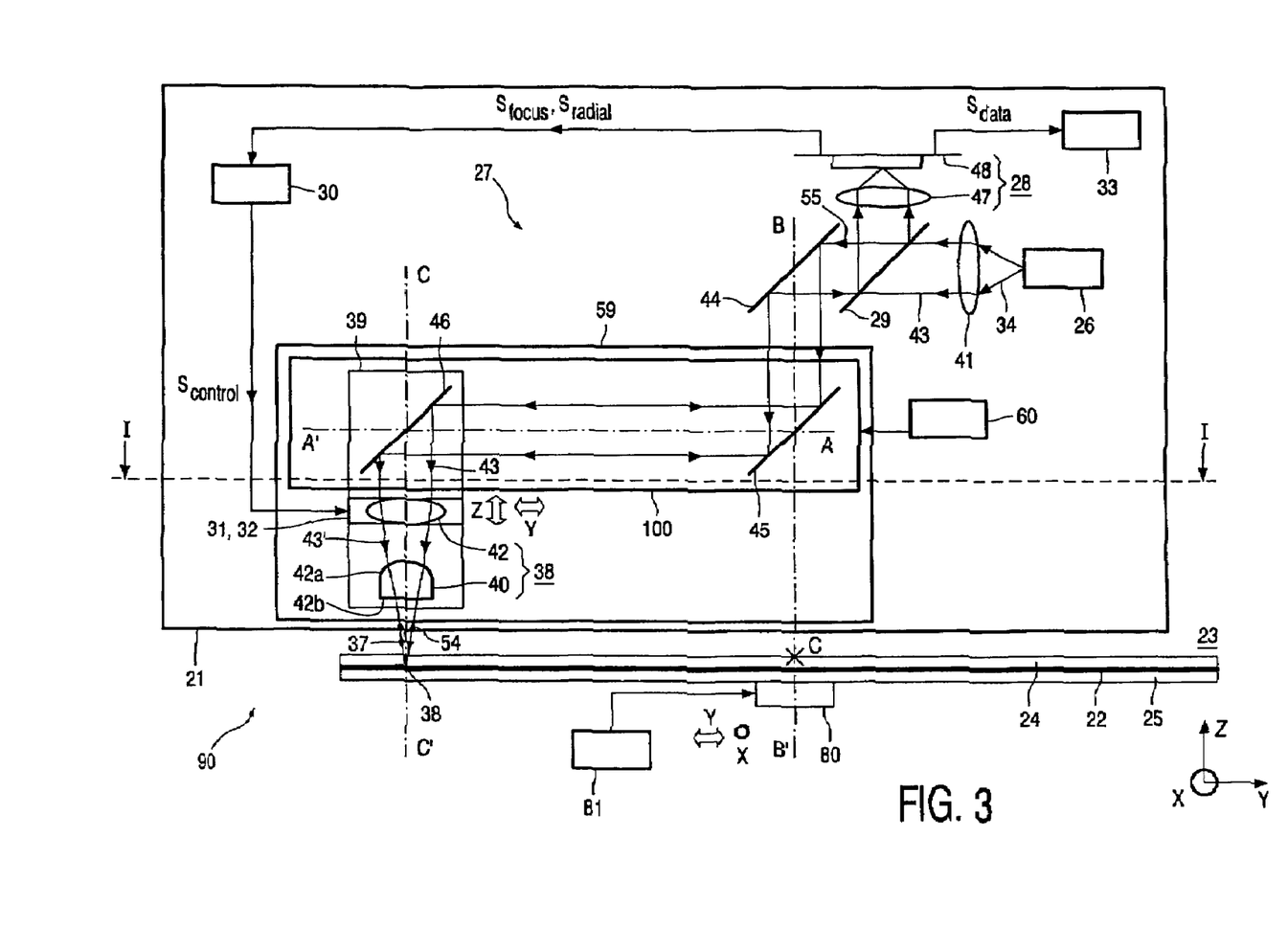
FIG. 3 is a schematic illustration of components of an optical scanning system including an optical record carrier and an optical scanning device, according to the invention.

FIG. 3 is a schematic illustration of the components of an optical scanning system including an optical record carrier 23 and an optical scanning device 21, according to the invention. The device 21 is for scanning a track of an information layer 22 of the optical record carrier 23. As previously defined with respect to FIG. 2, "Z" is the reference axis parallel to the axis of rotation BB', "Y" is the reference axis parallel to the radial direction with respect to and perpendicular to the axis of rotation BB', and "X" is the reference axis perpendicular to both the Z-axis and the Y-axis.

By way of illustration, the optical record carrier 23 includes a transparent layer 24 on one side of which the information layer 22 is arranged. The side of the information layer 22 facing away from the transparent layer 24 is protected from environmental influences by a protective layer 25; as shown in FIG. 3, the layers 22, 24 and 25 are planar in the directions of the X-axis and the Y-axis. The transparent layer 24 acts as a substrate for the carrier 23 by providing mechanical support for the information layer 22. Alternatively, the transparent layer 24 may have the sole function of protecting the information layer 22, while the mechanical support is provided by a layer on the other side of the information layer 22, for instance by the protection layer or by an additional information layer and transparent layer connected to the uppermost information layer. The information layer 22 is a surface of the carrier 23 that contains a track 22a (not shown in FIG. 3 but shown in FIG. 4) which is substantially circular with a center of curvature. As previously defined with reference to FIGS. 1 and 2, the X-, Y- and Z-axes defined with respect to the device substantially coincide with the $X_o$-, $Y_o$-and $Z_o$-axes defined with respect to the optical record carrier 23.

As shown in FIG. 3, the optical scanning device 21 includes a radiation source 26, a lens system 27 including a first objective lens assembly 39, a head rotation unit 59 and a first driving means 60. Preferably, the optical scanning device 21 further includes a collimator lens 41, a beam splitter 29, a detection system 28, a servocircuit 30, a, focus actuator 31 with respect to the Z-axis, a radial actuator 32 with respect to the Y-axis, and an information processing unit 33 for error correction.

The head rotation unit 59 is arranged for supporting the objective lens assembly 39 which is rotatable about an axis of rotation BB', as described in further detail below. The center of curvature C (not shown in FIG. 3 but shown in FIG. 4) of the track 22a substantially coincides with the axis of rotation BB'. The head rotation unit 59 is described in farther detailed below, in relation to FIGS. 5 through 9.

The driving means 60 is arranged for rotating the head rotation unit 59 about the axis of rotation BB'. It is described below in further detail, in relation to FIG. 5.

As shown in FIG. 3, the radiation source 26 is arranged for supplying a radiation beam 34. Preferably, the radiation source 26 includes at least one semiconductor laser that emits the radiation beam 34 at a selected wavelength λ. For instance, in the case where the optical record carrier 23 is of the so-called DVD format, the wavelength λ of the radiation beam 34 is between 620 and 700 nm and, preferably, equals 660 nm and, in the case where the optical record carrier 23 is of the so-called DVR-format, the wavelength λ preferably equals 405 nm. Furthermore, the radiation source 26 is provided with a grating structure (not shown in FIG. 3) for forming a first satellite radiation beam and a second satellite radiation beam (which are not shown in FIG. 3) from the radiation beam 34.

The collimator lens 41 is arranged for transforming the radiation beam 34 into a substantially collimated radiation beam 43.

The beam splitter 29 is arranged for transmitting a part of the radiation beam 43 in the direction of the objective lens assembly 39 and another part of the radiation beam 43 in the direction of the detection system 28. Preferably, the beam splitter 29 is formed by a plane parallel plate that is tilted with respect to the axis of rotation BB' so as to form an angle α with respect to this axis. Preferably, the angle α equals 45 degrees.

The lens system 27 is arranged for transforming the radiation beam 34 to a focused radiation beam 37 so as to form a scanning spot 38 in the position of the information layer 22. In the embodiment shown in FIG. 3, the lens system 27 includes two folding mirrors 44 and 45. The mirror 44 is arranged in a rotatable position with respect to the axis of rotation BB', for reflecting the reflected radiation beam 42 toward the objective lens assembly 39. Preferably, the mirror 44 is tilted with respect to the axis of rotation BB' so as to form an angle of 45 degrees. Notably, the mirrors 44 and 45 are arranged in respect of each other so that the centers of these mirrors are aligned with the axis of rotation BB'.

The objective lens assembly 39 of the lens system 27 includes (i) a first objective lens 40 having an optical axis CC' and (ii) a folding mirror 46. The objective lens 40 transforms the reflected radiation beam 43 to a converging radiation beam 43'. The mirror 46 is arranged in a rotatable position with respect to the axis of rotation BB' and in a fixed position with respect to the objective lens 40. Notably, the mirrors 46 and 45 are arranged in respect of each other so that the centers of these mirrors are aligned with an axis AA' which forms, in the present embodiment, an angle of 90 degrees with the axis of rotation BB'.

As an improvement (shown in FIG. 3) of the device 21, the objective lens assembly 39 further includes an additional objective lens 42 which forms, together with the objective lens 40, a doublet-lens system as described in WO 00/38182. The objective lens 42 transforms the converging radiation beam 43' to the focused radiation beam 37. The lens 42 may be a plano-convex lens having a convex entrance surface 42a that faces the objective lens 40, and a flat exit surface 42b that faces the position of the information layer 22. Thus, the focused radiation beam 37 has a numerical aperture NA depending on the distance between the objective lenses 40 and 42. By way of illustration, in the case where the optical record carrier 23 is of the so-called DVD format, the numerical aperture NA approximately equals 0.6 (for the "reading mode") and, in the case where the optical record carrier 23 is of the so-called DVR format, the numerical aperture NA approximately equals 0.65 for both the "writing mode" and the "reading mode." Furthermore, the entrance surface and/or the exit surface of one or two of the objective lenses 40 and 42 are preferably aspherical.

During scanning, the forward focused radiation beam 37 reflects on the information layer 22, thereby forming a backward radiation beam 34 which returns on the optical path of the forward focused radiation beam 37. The lens system 27 transforms the backward radiation beam 54 to a substantially collimated backward radiation beam 55. Finally, the beam splitter 29 separates the forward radiation beam 43 from the backward radiation beam 55 by transmitting at least part of the backward radiation beam 55 towards the detection system 28. By way of illustration only, the beam splitter 29 is formed by a plane parallel plate. As an alternative, it may be formed by a cubic prism having a reflective diagonal plane having coatings for being reflective for the forward radiation beam 43 and facets having coatings for being transmissive for the backward radiation beam 55. An advantage of forming the beam splitter with such a cubic prism is that it does not introduce optical aberrations, as opposed to a plane parallel plate which may introduce astigmatism and coma.

The detection system 28 is arranged for capturing the radiation of the radiation beam modulated by said optical record carrier 23 (i.e. the radiation beam 55 as well as the corresponding satellite radiation beams) and converting them into one or more electrical signals, as described below in further detail. The detection system 8 includes a converging lens 47 and a detector 48 which includes radiation-sensitive detection elements (not shown in FIG. 3) for providing detection signals and an electronic circuit for, in response to the detection signals, providing the electrical signals. One of the electrical signals is an information signal $S_{data}$, the value of which represents the information scanned on the information layer 22. The information processing unit 33 processes the information signal $S_{data}$ and, in response to that electrical signal, provides an error correction signal. Other signals from the detection system 28 are a focus error signal $S_{focus}$ and a radial tracking error signal $S_{radial}$. The signal $S_{focus}$ represents the axial difference in height along the axis of rotation BB' between the scanning spot 38 and the position of the information layer 22. Preferably, this signal is formed by the "astigmatic method" which is known from, inter alia, the book by G. Bouwhuis, J. Braat, A. Huijser et al, "Principles of Optical Disc Systems," p. 75–80 (Adam Hilger 1985) (ISBN 0-85274-785-3). The signal $S_{radial}$ represents the distance in the plane of the information layer 22 between the scanning spot 38 and the center line of a track in the information layer 22 to be followed by the scanning spot 38. Preferably, the signal $S_{radial}$ is formed by the "radial push-pull method" which is know from, inter alia, said book by G. Bouwhuis et al, p. 70–73.

The servocircuit 30 is arranged for, in response to the signals $S_{focus}$ and $S_{radial}$, providing servo control signals $S_{control}$ for controlling the position of the scanning spot 38 with respect to the position of the information layer 22, via the focus actuator 31 and the radial actuator 32, respectively. The focus actuator 31 controls the positions of the objective lenses 40 and 42 along the axis Z (parallel to the axis of rotation BB'). This enables the device 21 to control the actual position of the scanning spot 38 such that it coincides substantially with the plane of the information layer 22. The radial actuator 32 controls the position of the objective lenses 40 and 42 in a direction perpendicular to the axis Z. This enables the device 21 to control the radial positions of the scanning spot 38 such that it coincides substantially with the center line of the track to be followed in the information layer 22.

Figure 4:
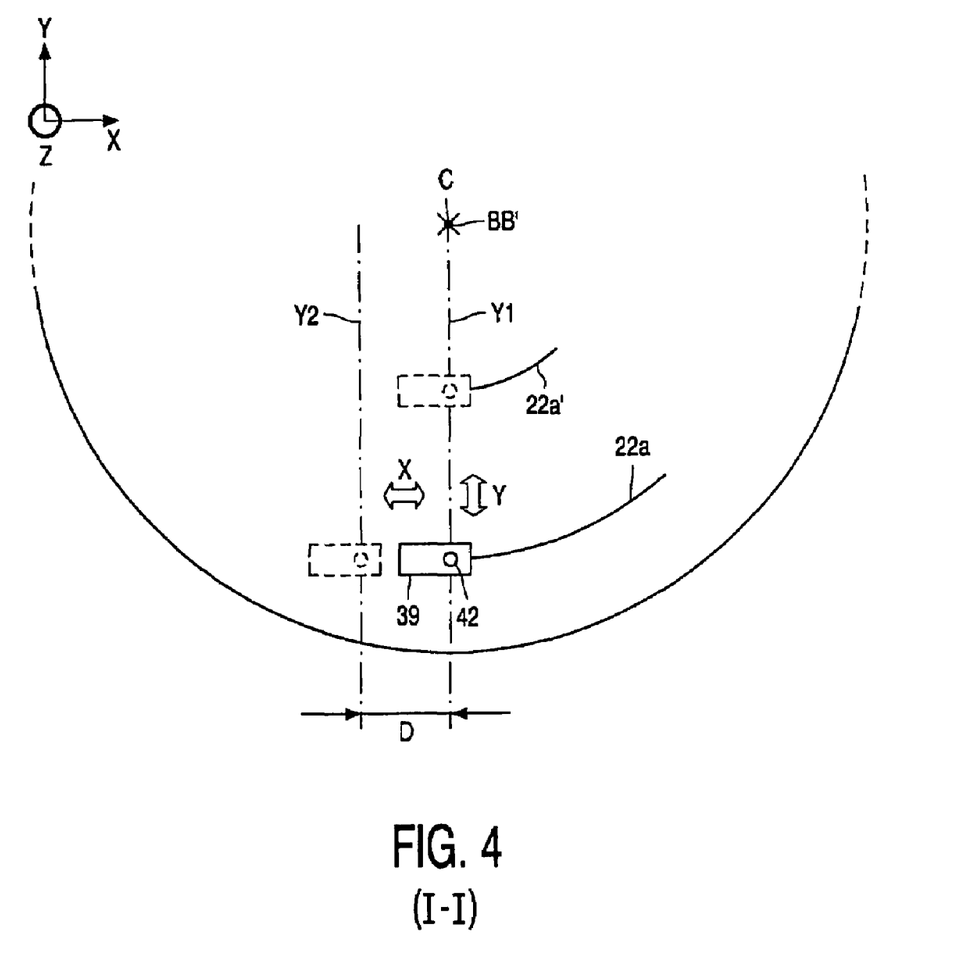
FIG. 4 shows certain components of the optical scanning device shown in FIG. 3, viewed along a line I—I indicated in FIG. 3.

According to the invention, the objective lens assembly 39 is movable substantially in the radial direction with respect to and perpendicular to the axis of rotation BB'. FIG. 4 shows certain components of the device shown in FIG. 3, representing the displacement of the objective lens assembly 39 with respect to the X- and Y-axes. In the present description and as shown in FIG. 4, a displacement of the objective lens assembly 39 substantially in the radial direction means: (a) either along the radial direction (that is, along an axis "$Y_1$" parallel to the Y-axis and passing through the center C of the track 22a), or (b) parallel to the radial direction (that is, along an axis $Y_2$ parallel to the $Y_1$-axis with a distance D between the $Y_1$- and $Y_2$-axes).

Figure 5:
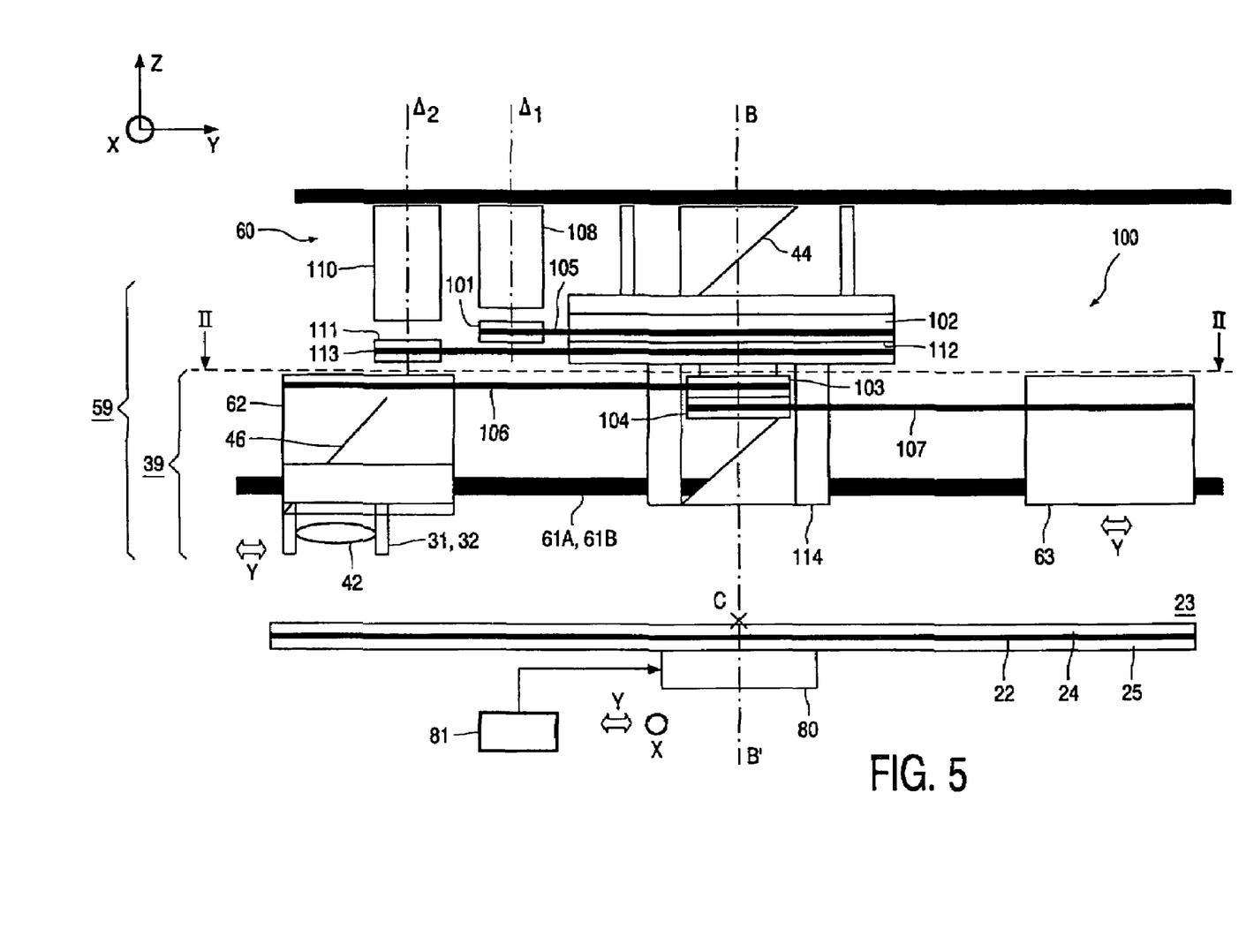
FIG. 5 shows a preferred embodiment of the positioning means of the optical scanning device shown in FIG. 3.
Figure 6:
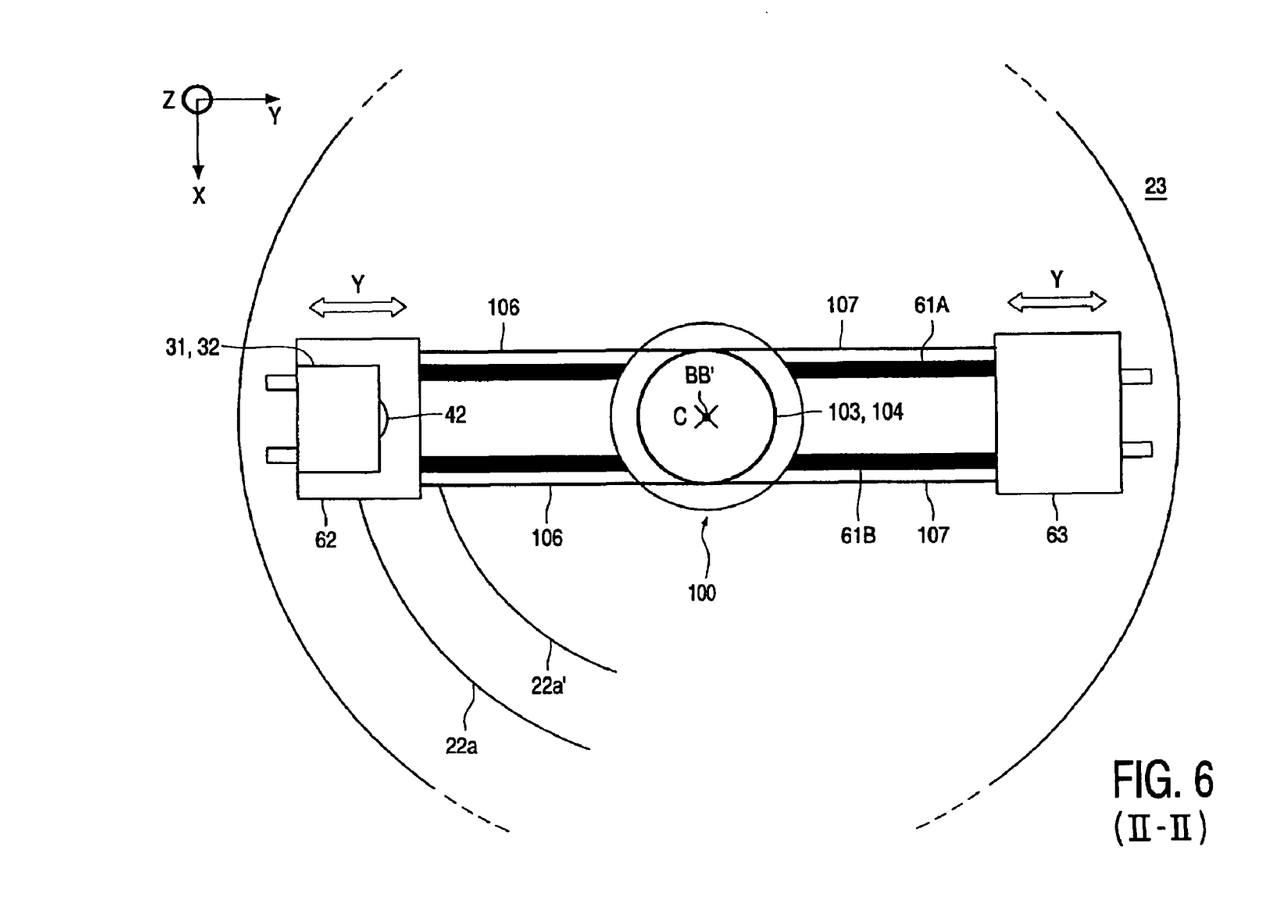
FIG. 6 shows certain components of the positioning means shown in FIG. 5, viewed along a line II—II indicated in FIG. 5.

The positioning of the objective lens assembly 39 with respect to the optical axis BB' and along the Y-axis is achieved by means a first positioning means 100 (not shown in FIG. 3). FIG. 5 shows a preferred embodiment of the first positioning means 100 including a first linear guide 61A, 61B, a sledge 62, four pulleys 101 through 104, three belts 105 through 107 and a motor 108. Furthermore, the positioning means 100 preferably includes a first counterbalancing means or counterweight 63 for keeping the center of gravity of the head rotation unit 59 substantially on the axis of rotation BB'. FIG. 6 shows certain components of the positioning means 100, viewed along a line II—II indicated in FIG. 5.

As shown in FIG. 5, the motor 108 has an axis of rotation $\Delta_1$ parallel to the Z-axis. The pulley 101 is rotatable about the axis of rotation $\Delta_1$ and the pulleys 102 through 104 are rotatable about the axis of rotation BB'. The pulleys 101 and 102 are mechanically coupled via the belt 105. The pulleys 102, 103 and 104 are fixed to the same axle (not shown). The pulley 103 is mechanically coupled to the sledge 62 via the belt 106 and the pulley 104 is mechanically coupled to the counterweight 63 via the belt 107. The sledge 62 carries the objective lens assembly 39 and is capable of moving along the linear guide 61A, 61B with respect to the axis of rotation BB'. The linear guide 61A, 61B extend in the radial direction along the Y-axis. Preferably, the counterweight 63 is diametrically opposed to the objective lens assembly 39 with respect to the axis of rotation BB'. More preferably, the counterweight 43 includes a second objective lens assembly.

The driving means 60 includes a motor 110, two pulleys 111 and 112, one belt 113 and a support element 114, as also shown in FIG. 5. The motor 110 has an axis of rotation $\Delta_2$ parallel to the Z-axis. The pulley 111 is rotatable about the axis of rotation $\Delta_2$ and the pulley 112 is rotatable about the axis of rotation BB'. The pulleys 111 and 112 are mechanically coupled via the belt 113. The pulley 112 and the linear guide 61A, 61B are fixed to the support element 114. Notably, the pulley 102 can rotate independently of the pulley 112 and vice versa.

It is noted that a coarse positioning of the objective lens assembly 39 along the Y-axis is achieved by means of the first positioning means 100. It is also noted that a finer positioning of the objective lens assembly 39 along the Y-axis (as well as along the Z-axis) is achieved by means of the servocircuit 30 and the actuators 31, 32 used for focus tracking and radial tracking. Therefore, the objective lens assembly 39 is positioned for maintaining the scanning spot 38 (shown in FIG. 3) in focus and on track with the track to be scanned (the track 22a or 22a' in FIG. 4). It is noted that the first positioning means 100 also allows the positioning of the objective lens assembly 39 along the X-axis, thereby making the scanning device 21 more tolerant to displacement of the objective lens assembly 39 in the tangential direction than known devices. Therefore, the optical scanning device 21 allows positioning of the objective lens assembly 39 along the X-, Y- and Z-axes. Alternatively, a finer positioning of the objective lens assembly 39 along the Z-axis may also be achieved by controlling the position of the mirror 44.

During scanning of the optical record carrier 23, the motor 110 drives the pulley 111 which therefore rotates about the axis $\Delta_2$. The pulley 111 drives, via the belt 113, the pulley 112 which therefore rotates about the axis BB'. Thus, the sledge 62 and the counterweight 63 rotate about the axis BB'. It is noted that, during scanning, the rotation velocities of the motors 108 and 110 equal each other, thereby allowing the track 22a to be scanned.

During the positioning of the sledge 62 along the radial direction (Y), the motor 108 drives the pulley 101 which therefore rotates about the axis $\Delta_1$. The pulley 101 drives, via the belt 105, the pulley 102 which therefore rotates about the axis BB'. The pulley 102 drives both the pulleys 103 and 104 which move, via the belts 106 and 107, the sledge 62 and the counterweight 63 along the radial direction (Y) with respect to the axis of rotation BB'. It is noted that, during positioning, the rotation velocities of the motors 108 and 110 differ mutually, thereby allowing the positing of the sledge 62 with respect to the axis BB', via the pulleys 101 through 104 and the belts 105 through 107. It is also noted that, when positioning the objective lens assembly 39 from the inside to the outside of the disc, the angular velocity of the objective lens assembly 39 slows down. This is useful in case of scanning at constant linear velocity.

Figure 7:
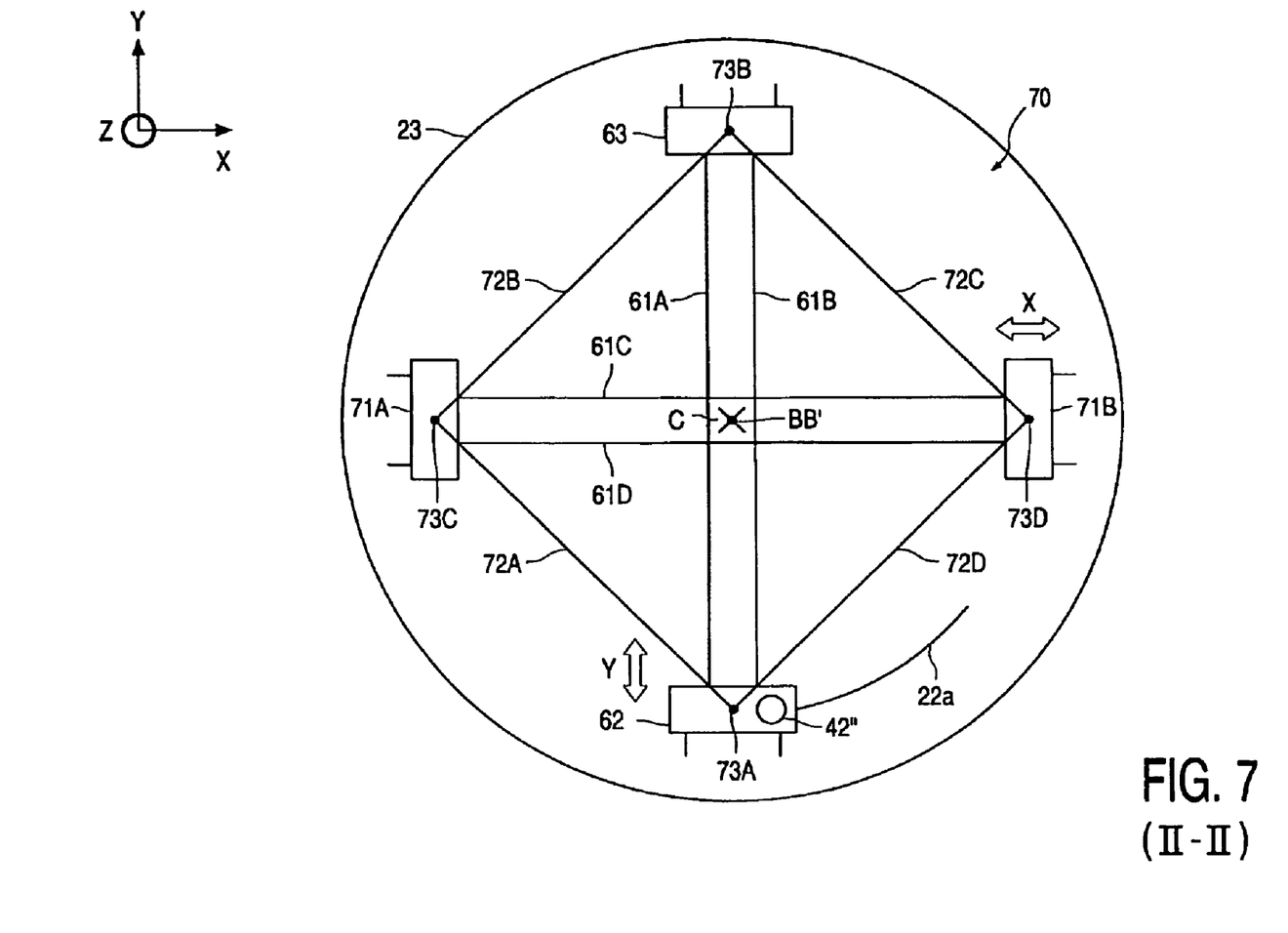
FIG. 7 shows an improvement of the positioning means shown in FIG. 5, viewed along the line II—II indicated in FIG. 5.

FIG. 7 shows an improvement of the positioning means 100 shown in FIGS. 5 and 6, viewed along the line II—II indicated in FIG. 5. As shown in FIG. 7, the positioning means 100 further includes a second counterbalancing means 70 for reducing the dependence of the centrifugal forces of the head rotation unit 59 (not shown in FIG. 7) on its rotation frequency. By way of illustration only, the counterbalancing means 70 includes a second linear guide 61C, 61D and two bodies 71A and 71B. The linear guide 61A, 61B, the linear guide 61C, 61D, the sledge 62, the counterweight 63 and the bodies 71A and 71B are arranged in the form of a rhomb having sides of fixed length, variable angles and a center of gravity which substantially coincides with the axis of rotation BB'. The linear guide 61C, 61D is substantially perpendicular to both the axis of rotation BB' and the first linear guide 61A, 61B. The sledge 62 and the counterweight 63 are arranged to be movable with respect to the axis BB' along the linear guide 61A, 61B. The bodies 71A and 71B are arranged to be movable with respect to the axis BB' along the linear guide 61C, 61D. The positioning means 100 shown in FIG. 7 may be provided with driving means similar to the driving means 60 described with reference to FIG. 5.

It is noted that, when positioning the objective lens assembly 39 from the inside to the outside of the disc, the moment of inertia of the rhomb remains substantially constant during rotation. This allows scanning at constant angular velocity.

It is common in the art that, in such an optical scanning device where the objective lens rotates with respect to the carrier, the information scanning rate, i.e. the rate at which information may be scanned, can be higher than in conventional optical scanning devices where the optical record carrier rotates and the objective lens system is stationary. Indeed, in such a conventional device, an upper limit of the rotation frequency for the carrier is typically 150 Hz. If the carrier rotates beyond that limit, unwanted effects start to appear, such as apparition of mechanical vibrations in the carrier, generation of acoustic noise, a significant increase in the electrical consumption of the device, and a disintegration of the carrier (for frequencies higher than 300 Hz). It is noted that, in the embodiment of the optical scanning device shown in FIG. 3 et seq., the rotatable elements are made of materials, e.g. aluminum, having elastic properties (e.g. tensile strength) that allow a rotation of these elements at a frequency higher than 150 Hz without causing said unwanted effects. It is also noted that, in the known devices where the record carrier rotates, the latter is commonly made of plastic that does not allow its rotation at a frequency higher than 150 Hz.

It is to be appreciated that numerous variations and modifications may be employed in relation to the embodiments described above, without departing from the scope of the invention which is defined in the appended claims.

Figure 8:
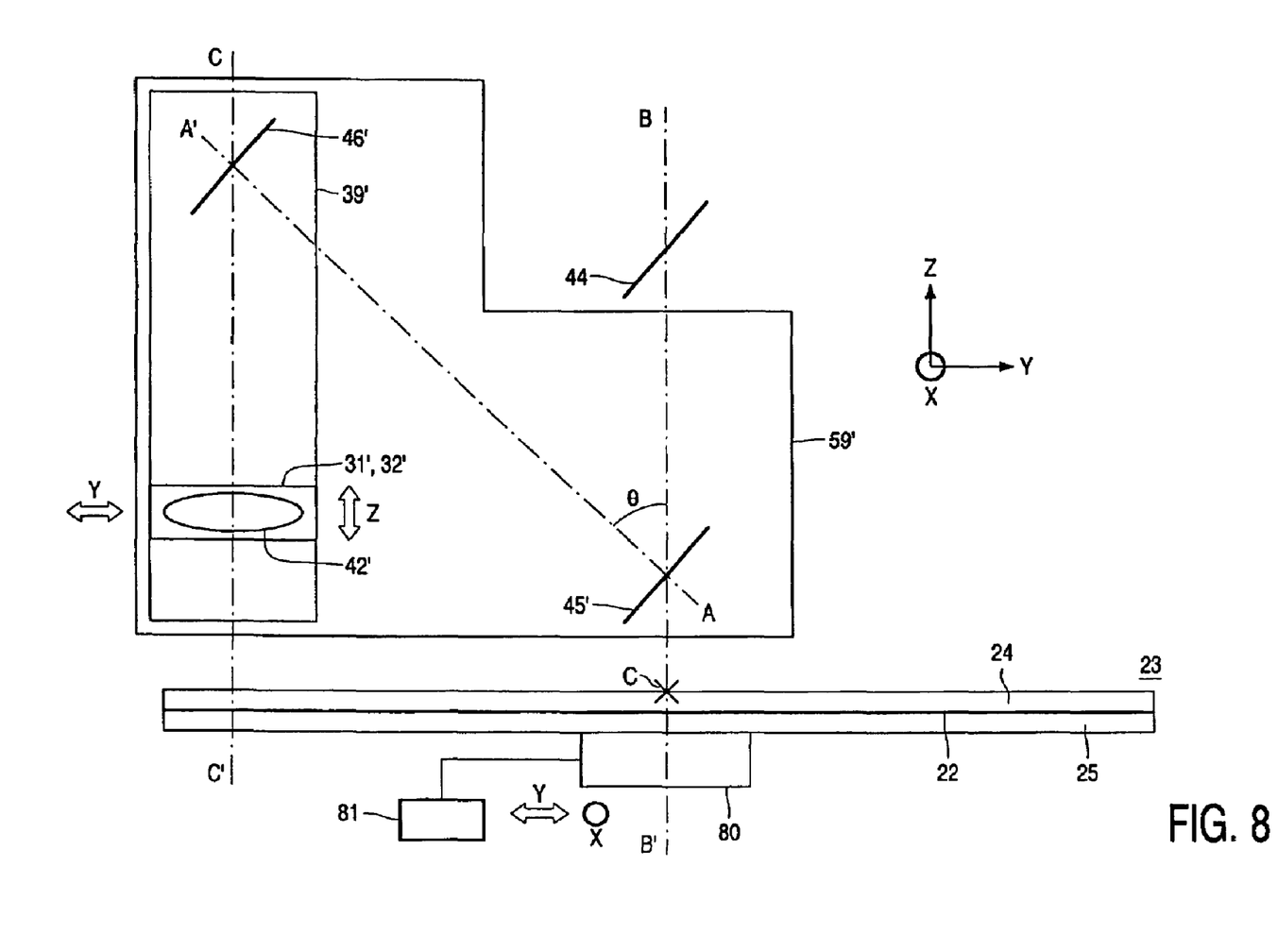
FIG. 8 shows another embodiment of the head rotation unit shown in FIG. 3.

FIG. 8 shows another embodiment of the head rotation unit, 59', where the three mirrors 44, 45 and 46 are arranged so that the axes AA' and BB' have mutually an angle θ which is less than 90 degrees (for instance, 45 degrees as shown in FIG. 8).

As an improvement of the optical scanning device 21 and with reference to FIG. 3, the optical scanning device 21 further includes a second driving means 80 for rotating the optical record carrier 23 about the axis of rotation BB' in a sense of rotation which is opposite to the rotation of the head rotation unit 59. The driving means 80 may be formed by any conventional electrical motor.

Also as an improvement of the optical scanning device 21 and with reference to FIG. 3, the optical scanning device 21 further includes a second positioning means 81 for positioning the optical record carrier 23 in the XY-plane substantially perpendicular to the axis of rotation BB'. For instance, the second positioning means 81 may be formed by a worm pulley apparatus as already described with reference to FIG. 2 and to U.S. Pat. No. 4,219,704. An advantage of providing the optical device with such a second positioning means is to allow the centering of the track with the axis of rotation of the objective lens assembly, e.g. in order to compensate the decentering of the track with respect to the center of the disc (in the order of 200 μm).

As an alternative of the optical scanning device, the device is of the type capable of performing simultaneous multi-track scanning. This advantageously results in improving data read-out in the "reading mode" and/or write speed in the "writing mode" as described, for example, in the U.S. Pat. No. 4,449,212. The description of the multi-tracking arrangement according to the U.S. Pat. No. 4,449,212 is incorporated herein by reference.

As an alternative of an optical record carrier 23 having the shape of a disc, the tracks are arranged in the form of a circle or a spiral made on a substrate having various shapes, for instance, on a non-round substrate or on a flexible substrate such as a foil. This advantageously results in greater freedom for choosing the shape of the optical record carrier to be scanned.

The invention claimed is:

1. An optical scanning device for scanning a track of an information layer of an optical record carrier using a radiation beam, the track being substantially circular with a center of curvature, the optical scanning device comprising:

a radiation source for providing said radiation beam;

a lens system for transforming said radiation beam to a scanning spot on said information layer, the lens system including a first objective lens assembly having an optical axis;

a head rotation unit for supporting said first objective lens assembly, the head rotation unit being rotatable about an axis of rotation, and said center of curvature of said track being substantially coinciding with said axis of rotation; and a first driving means for rotating said head rotation unit about said axis of rotation, characterized in that said first objective lens assembly is movable substantially in a radial direction with respect to and perpendicular to said axis of rotation, wherein said head rotation unit further comprises a first positioning means for controlling a position of said first objective lens assembly substantially in said radial direction with respect to said axis of rotation, and wherein said first positioning means further includes a first counterbalancing means for keeping the center of gravity of said head rotation unit substantially on said axis of rotation.

2. The optical scanning device as claimed in claim 1, wherein said first counterbalancing means includes a second objective lens assembly.

3. An optical scanning device for scanning a track of an information layer of an optical record carrier using a radiation beam, the track being substantially circular with a center of curvature, the optical scanning device comprising;
   a radiation source for providing said radiation beam;
   a lens system for transforming said radiation beam to a scanning spot on said information layer, the lens system including a first objective lens assembly having an optical axis;
   a head rotation unit for supporting said first objective lens assembly, the head rotation unit being rotatable about an axis of rotation, and said center of curvature of said track being substantially coinciding with said axis of rotation; and
   a first driving means for rotating said head rotation unit about said axis of rotation,
   characterized in that said first objective lens assembly is movable substantially in a radial direction with respect to and perpendicular to said axis of rotation,
   wherein said head rotation unit further comprises a first positioning means for controlling a position of said first objective lens assembly substantially in said radial direction with respect to said axis of rotation, and
   wherein said first positioning means further includes a second counterbalancing means for reducing the dependence of the centrifugal forces of said head rotation unit on its rotation frequency.

4. The optical scanning device as claimed in claim 3, wherein said first objective lens assembly and said first positioning means provided with said second counterbalancing means are arranged in the form of a rhomb having sides of a fixed length, variable angles and a center of gravity substantially coinciding with said axis of rotation.

5. An optical scanning system for scanning an optical record carrier, the optical scanning system including an optical record carrier having an information layer provided with a substantially circular track, and an optical scanning device for scanning a track of an information layer of an optical record carrier using a radiation beam, the track being substantially circular with a center of curvature, the optical scanning device comprising:
   a radiation source for providing said radiation beam;
   a lens system for transforming said radiation beam to a scanning spot on said information layer, the lens system including a first objective lens assembly having an optical axis;
   a head rotation unit for supporting said first objective lens assembly, the head rotation unit being rotatable about an axis of rotation, and said center of curvature of said track being substantially coinciding with said axis of rotation; and
   a first driving means for rotating said head rotation unit about said axis of rotation,
   characterized in that said first objective lens assembly is movable substantially in a radial direction with respect to and perpendicular to said axis of rotation, wherein said optical record carrier includes a non-round substrate.

6. The optical scanning system as claimed in claim 5, wherein said optical record carrier includes a flexible substrate.

* * * * *